United States Patent [19]
Yang

[11] Patent Number: 5,647,646
[45] Date of Patent: Jul. 15, 1997

[54] ANTI-LOCK BRAKING CONTROL DEVICE FOR A HYDRAULIC BRAKE SYSTEM OF AN AUTOMOBILE

[75] Inventor: Chang-Wen Yang, Taipei, Taiwan

[73] Assignee: Edward Shih, Taipei, Taiwan

[21] Appl. No.: 520,824

[22] Filed: Aug. 29, 1995

[51] Int. Cl.$^6$ ................................................. B60T 15/58
[52] U.S. Cl. .................. 303/115.2; 303/116.4; 303/61
[58] Field of Search ........................ 303/61, 115.2, 303/116.4, 188, 3, 10, 15, 20, 113.1

[56] References Cited

U.S. PATENT DOCUMENTS

| | | | |
|---|---|---|---|
| 3,466,098 | 9/1969 | Pieren et al. | 303/61 |
| 3,951,465 | 4/1976 | Stage | 303/61 X |
| 4,109,970 | 8/1978 | Ashby, Jr. | 303/61 X |
| 4,715,665 | 12/1987 | Ostwald | 303/61 X |
| 4,755,007 | 7/1988 | Mollat | 303/116.4 X |

*Primary Examiner*—Lee W. Young
*Attorney, Agent, or Firm*—Ladas & Parry

[57] ABSTRACT

An anti-lock braking control device includes a housing which defines cylindrical first chamber, two second chambers and a third chamber. The housing has two which are inlet ports connected to two master cylinders and two outlets ports which are connected to rear and front brakes. The third chamber is communicated with the inlet ports and is connected to two second chambers by two oil passages. The second chambers are aligned with one another and are connected to the first chamber. A rotor shaft with a driving disk is mounted rotatably in the first chamber. An oil regulator assembly is mounted in the third chamber for controlling the flow rate of hydraulic oil from the master cylinders to the second chambers. Each of a pair of reciprocating pump assemblies has a rod member which is driven by the driving disk to move reciprocally in a respective one of the second chambers. One end of the rod member extends into an oil chamber which is communicated with a respective one of the oil passages and one of the outlet ports in order to produce pressure waves to the rear and front brakes when the rotor shaft is driven by a power-driven motor. A pressure switch unit is connected to one of the second chambers and the motor in order to actuate the motor when the oil pressure is larger than a predetermined value.

5 Claims, 5 Drawing Sheets

ANTI-LOCK BRAKING CONTROL DEVICE FOR A HYDRAULIC BRAKE SYSTEM OF AN AUTOMOBILE

BACKGROUND OF THE INVENTION

1. Field of the Invention

This invention relates to an auxiliary device for an automobile brake system, and more particularly to an anti-lock braking control device for a hydraulic brake system of an automobile.

2. Description of the Related Art

At present, anti-lock braking systems have been widely used in automobiles for ensuring safety when driving. Generally, the anti-lock braking systems are controlled either by an electronic device or a mechanical device. The anti-lock braking system of the electronic type is very complex and has a computer and sensors which are installed in each wheel to detect the occurrence of a skid or lock-up condition. In an example of the prior art, information that sensors gather causes a high pressure hydraulic pump to reduce the pressure in the wheel that is just about ready to skid. In this manner, the wheels are allowed, in a controlled fashion, to be relieved of pressure from the brake shoe or pad in order to rotate again, albeit in a very short period of time. As soon as the wheels start to rotate, the computer again controls the hydraulic pump to apply pressure to the brakes in order to stop the wheels from rotating. This sequence is repeated normally at a rate of 4 times/second. It is known that the maximum braking action is achieved just before the wheels skid on a surface. Such an electronic type anti-lock braking system is expensive due to its complexity.

In another case, the anti-lock braking system of the mechanical type is controlled by a brake rubber member which is installed in a closed chamber. Specifically, when the brake pressure exceeds a predetermined value, the brake rubber member will deform or expand to increase its volume, thereby reducing the braking pressure in the brake lines in order to prevent the wheels from being locked up. When the brake rubber member is retracted to its original state, the brake pressure in the brake lines are increased to prevent the wheel from rotating. This sequence is repeated to achieve an intermittent braking effect, as described above. The anti-lock braking system of the mechanical type is simple in structure, is easy to install in an automobile hydraulic brake system, and is relatively inexpensive to manufacture. However, because the response of the brake rubber member is much slower that of the electronic devices, the response of the mechanical type anti-lock braking system is poorer than that of the electronic type anti-lock braking system.

Therefore, there is a need for an anti-lock braking system which has a simple structure and a quick response for effecting the intermittent brake action.

SUMMARY OF THE INVENTION

It is therefore a main object of this invention to provide an anti-lock brake control device for a hydraulic braking system of an automobile which has a simple structure and a quick response.

According to the present invention, the anti-lock brake control device is used in a hydraulic braking system of an automobile which includes a pair of master cylinders, and front and rear brakes of the automobile. The anti-lock braking control device is installed between the master cylinders and the front and rear brakes and comprises a housing, a rotor shaft, an oil regulator assembly, a power-driven motor, a pair of reciprocating pump assemblies, and a pressure switch means.

The housing has two inlet ports, each of which is connected to a respective one of the master cylinders, and two outlet ports, each of which is connected to a respective one of the front and rear brakes. The housing defines therein a cylindrical first chamber, and two cylindrical second chambers which are aligned with one another. Each of the second chambers has a first end which is connected perpendicularly to the first chamber and a second end which is opposite to the first end. A cylindrical third chamber is communicated with the inlet ports. A pair of oil passages connect the third chamber to the second ends of the second chambers. Each of the outlet ports is formed adjacent to a respective one of the second ends of the second chambers.

The rotor shaft is mounted coaxially and rotatably in the first chamber and has a driven end and a driving disk which is fixed coaxially adjacent to the first ends of the second chambers. The driving disk has a periphery which is formed with a plurality of equally spaced lobes and rounded concave portions between the lobes.

The oil regulator assembly is mounted in the third chamber for controlling flow rate of hydraulic oil from the master cylinders into the oil passages and the second ends of the second chambers.

The power-driven motor is fixed to the housing and has an output shaft which extends into the first chamber and which is connected to the driven end of the rotor shaft in order to drive the rotor shaft to rotate.

The reciprocating pump assemblies are positioned respectively in the second chambers. Each of the reciprocating pump assemblies has a first part which blocks a corresponding one of the first ends of the second chambers and which is formed with a ball-receiving cavity that opens to the first chamber. Each of the reciprocating pump assemblies further has a second part which is adjacent to a corresponding one of the second ends of the second chambers and which is formed with an oil chamber that is separated from the ball-receiving cavity. A rod member is disposed between the first and second parts such that the first end of the rod member extends slidably and sealingly into the ball-receiving cavity and the second end of the rod member extends slidably and sealingly into the oil chamber. A ball member is received in the ball-receiving cavity. Each of the oil chambers is communicated with the corresponding one of the second chambers which is in turn communicated with a corresponding one of the oil passages and one of the outlet ports so that the hydraulic oil of the hydraulic brake system can fill the oil chambers and exert an oil pressure on the second ends of the rod members in order to push the ball members to abut the periphery of the driving disk of the rotor shaft.

A pressure switch means is connected fluidly to one of the second ends of the second chambers and is connected electrically to the power-driven motor for actuating the motor when the oil pressure of the hydraulic oil is greater than a predetermined value.

When the motor is actuated to rotate the rotor shaft, each of the ball members will be driven by the periphery of the driving disk of the rotor shaft to push a respective one of the rod members to move reciprocally, thereby producing pressure waves which are transmitted to the front and rear brakes and providing an intermittent brake effect.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
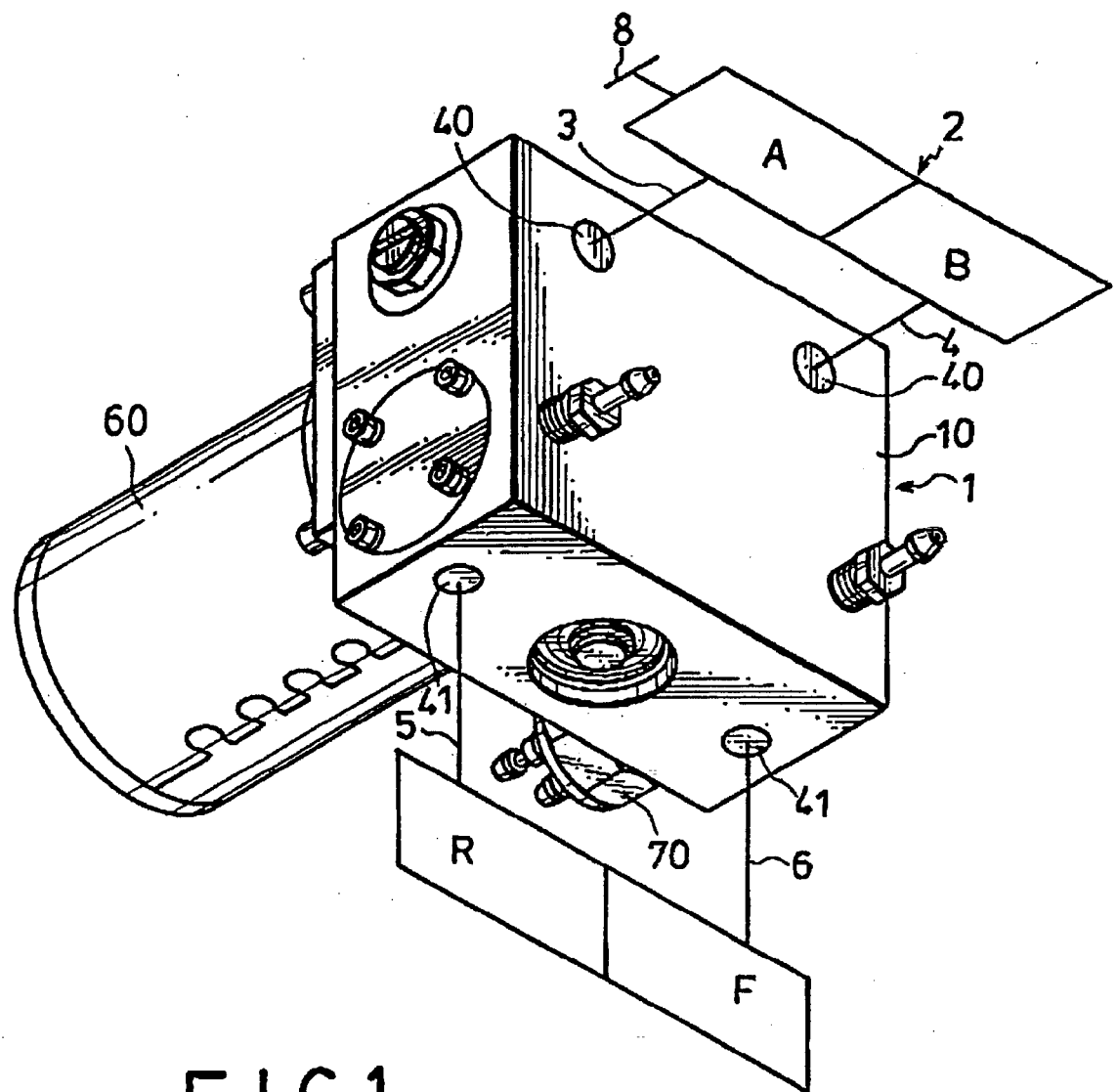
FIG. 1 is a schematic view showing the anti-lock braking control device of the present invention in a dual brake system of an automobile.

FIG. 1 shows a hydraulic brake system with a tandem master cylinder 2 that has front (B) and rear (A) master cylinders which are actuated by a brake pedal 8. The anti-lock braking control device 1 of the present invention is installed between the master cylinder 2 and the rear (R) and front (F) wheel brakes of the automobile. The dual or two-circuits braking system of FIG. 1 includes separate oil brake circuits 3 and 4 connected respectively to the inlet ports 40 of the anti-lock braking control device 1. A pair of outlet ports 41 are connected respectively from the anti-lock braking control device I to the separate lines 5 and 6 of the rear and front brake circuits 3 and 4.

Figure 2:
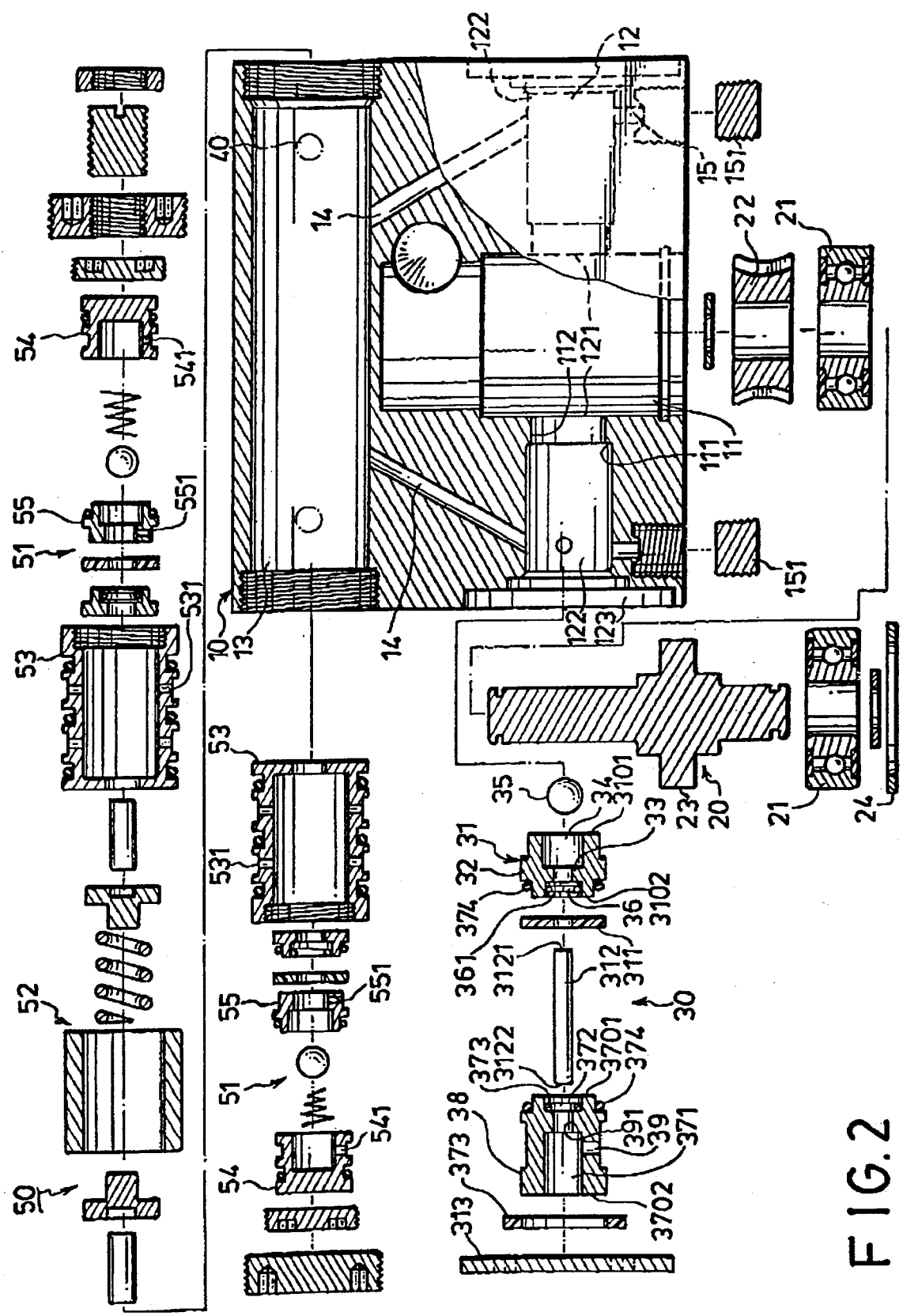
FIG. 2 is a sectional exploded view of the anti-lock braking control device of the present invention.

Referring to FIG. 2, the preferred embodiment of the anti-lock braking control device 1 of the present invention is shown to comprise a housing 10, a rotor shaft 20, an oil regulator assembly 50, a power-driven motor 60, a pair of reciprocating pump assemblies 30, and a pressure switch means 70.

The housing 10 is made of a metal material and defines therein a cylindrical first chamber 11 and two cylindrical second chambers 12 which are aligned with one another. Each of the second chambers 12 has a first end 121 which is connected perpendicularly to the first chamber 11 and a second end 122 which is opposite to the first end 121. A cylindrical third chamber 13 is communicated with the inlet ports 40. A pair of oil passages 14 connect the third chamber 13 to the second ends 122 of the second chambers 12, respectively. Each of the outlet ports 41 is formed adjacent to the respective one of the second ends 122 of the second chambers 12. The housing 10 further has a pair of vent holes 15 which may be closed by a pair of screwed caps 151.

Figure 3:
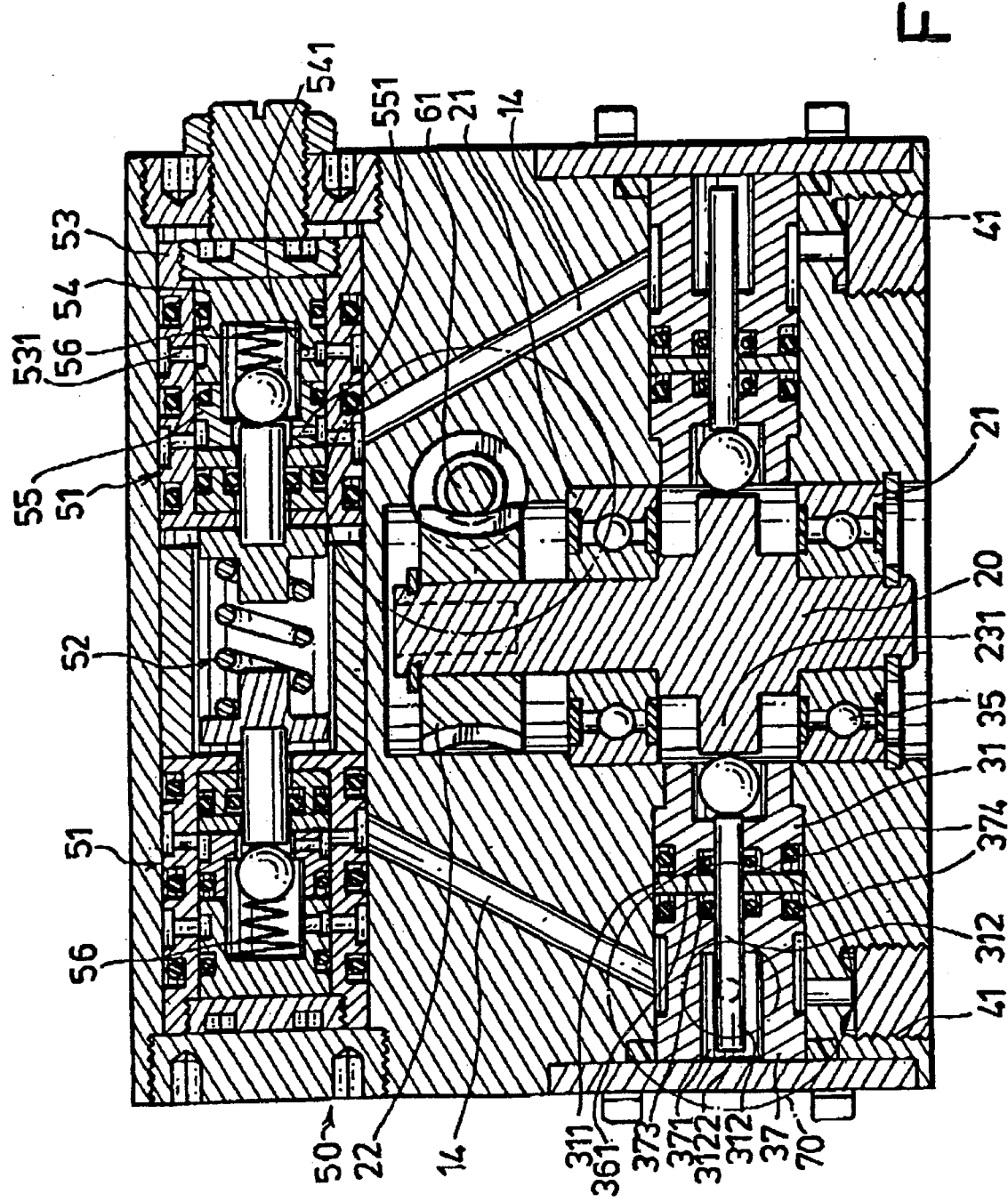
FIG. 3 is a cross sectional view of the anti-lock braking control device according to the present invention.
Figure 5:
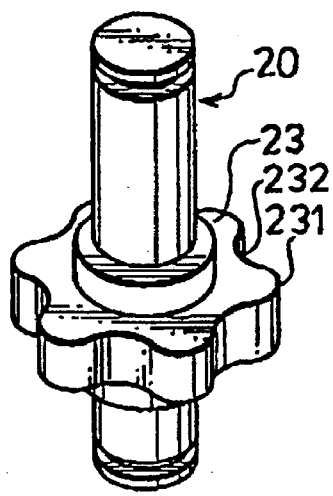
FIG. 5 is a perspective view of the rotor shaft with the driving disk of the present invention.

With reference to FIG. 3, the rotor shaft 20 is mounted coaxially and rotatably in the first chamber 11 by bearings 21 and a retaining ring 24. The rotor shaft 20 has a driven end which has a worm wheel 22 fixed thereto and a driving disk 23 which is fixed coaxially adjacent to the first ends 121 of the second chambers 12. The driving disk 23 has a periphery which is formed with six equally spaced lobes 231 and six rounded concave portions 232 between the lobes 231, as best illustrated in FIG. 5.

Referring to FIGS. 2 and 3, the oil regulator assembly 50 is mounted in the third chamber 13 for controlling flow rate of hydraulic oil from the master cylinders (B, A) into the oil passages 14 and the second ends 122 of the second chambers 12. The oil regulator assembly 50 comprises a pair of flow control devices 51 which are separated by a biasing mechanism 52. Each of the flow control devices 51 has a cylindrical member 53 with oil holes 531, and two cap members 54, 55 which are combined to define cooperatively a regulator chamber 56, as shown in FIG. 3. The cap members 54, 55 are respectively provided with through holes 541 and 551 so that the hydraulic oil of the master cylinders (B, A) can flow through the inlet ports 40, oil holes 531, through holes 541, the regulator chamber 56, and the through holes 551 and flow into the oil passages 14.

Figure 6:
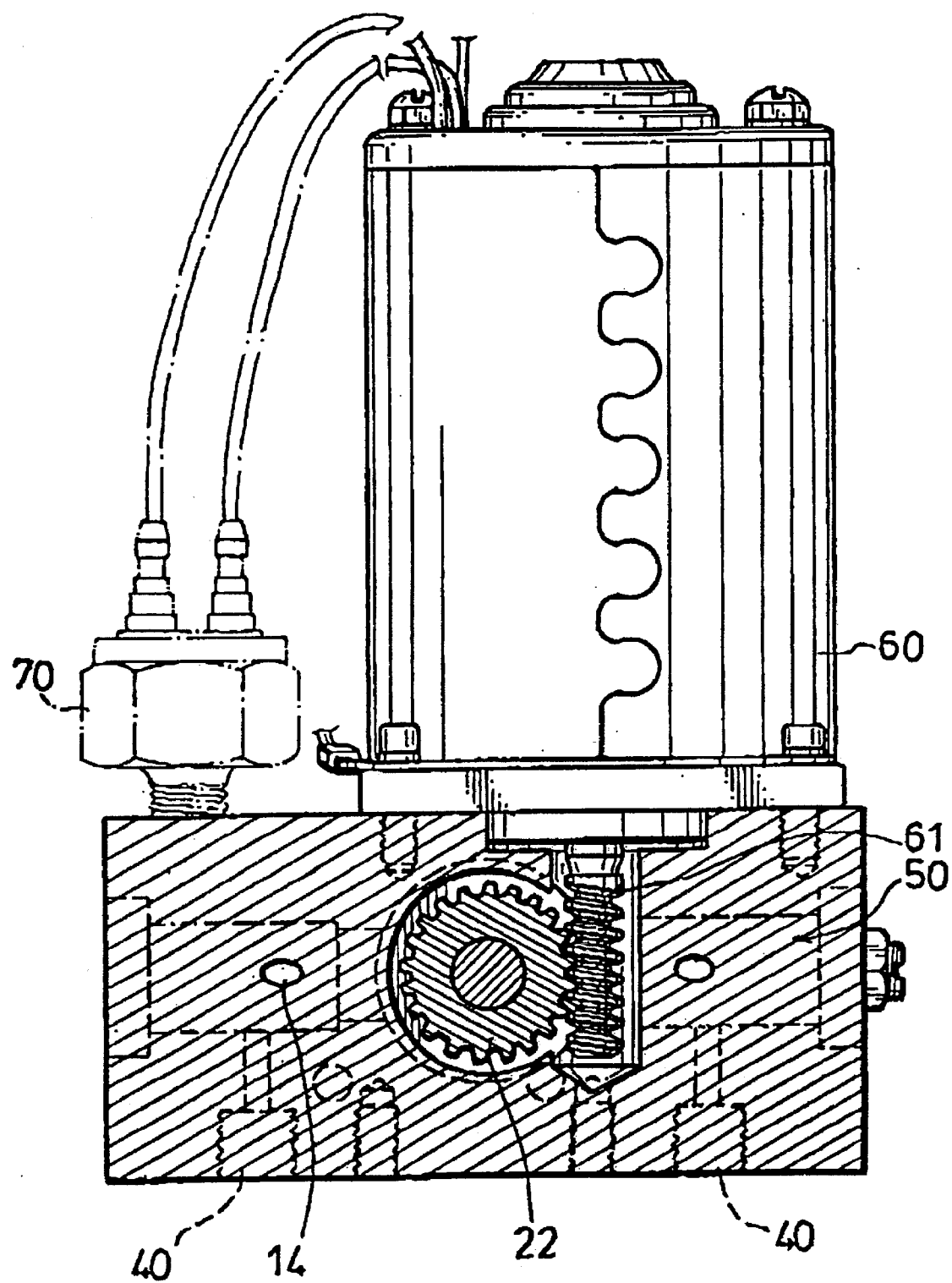
FIG. 6 is a partial sectional view illustrating the worm of the power-driven motor which meshes with the worm wheel of the rotor shaft according to the present invention.

The power-driven motor 60 is fixed to the external face of the housing 10 and has an output shaft 61 which extends into the first chamber 11. In this embodiment, the output shaft 61 is a worm which is connected to the worm wheel 22 of the rotor shaft 20 in order to drive the rotor shaft 20 to rotate, as best illustrated in FIG. 6.

Referring to FIGS. 2 and 3, the reciprocating pump assemblies 30 are positioned respectively in the second chambers 12. Each of the reciprocating pump assemblies 30 has a first part 31 which blocks the corresponding one of the first ends 121 of the second chambers 12 and which is formed with a ball-receiving cavity 34 that opens to the first chamber 11. Each of the first parts 31 of the reciprocating pump assemblies 30 is generally cylindrical and has a first end 3101 which is fitted into the respective one of the diameter-reduced portions 112 that are formed adjacent to the first ends 121 of the second chambers 12. An outward radial flange 32 abuts the corresponding one of the shoulders 111 which are formed adjacent to the diameter-reduced portions 112 of the second chambers 12 in order to block the corresponding one of the first ends 121 of the second chambers 12. A first annular flange 33 extends from the internal face of each of the first parts 31 such that the ball-receiving cavity 34 is formed adjacent to the first end 3101 of the first part 31 and such that a first seal-receiving cavity 36 is formed adjacent to the second end 3102 of the first part 31. A first O-ring 361 is provided in the first seal-receiving cavity 36. Each of the ball-receiving cavities 34 has a ball member 35 received therein.

Each of the reciprocating pump assemblies 30 further has a second part 37 which is adjacent to the respective one of the second ends 122 of the second chambers 12. Each of the second parts 37 is generally cylindrical and has a first end 3701 and a second end 3702 which extends to the respective one of the enlarged open ends 123 of the second chambers 12. An outward radial ring 38 is formed adjacent the second end 3702 and engages the internal face of the respective one of the second chambers 12. A second annular flange 391 extends from the internal face of each of the second parts 37 such that an oil chamber 371 is formed adjacent to the second end 3702 of the second part 37, and such that a second seal-receiving cavity 372 is formed adjacent to the first end 3701 of the second part 37. A through hole 39 is formed adjacent to the second end 3702 of the second part 37 to communicate the oil chamber 371 and the oil passage 14. A second O-ring 373 is provided in the second seal-receiving cavity 372.

A pair of cover plates 313 are fixed to the of the second ends 122 of the second chambers 12 in order to close the enlarged open ends 123 and the second ends 3702 of the second parts 37. A sealing ring 373 is provided between each of the cover plates 313 and each of the second ends 3702 of the second parts 37.

A rod member 312 is disposed between each of the first and second parts 31, 37. The first end 3121 of the rod member 312 extends slidably and sealingly through the first seal-receiving cavity 36, the first sealing ring 361 and the first annular flange 33 into the ball-receiving cavity 34. The second end 3122 of the rod member 312 extends slidably and sealingly through the second seal-receiving cavity 372, the second O-ring 373 and the second annular flange 391 into the oil chamber 371. A guiding disc 311 is passed through by the rod member 312 and is sandwiched between the second end 3102 of the first part 31 and the first end 3701 of the second part 37, as best illustrated in FIG. 3. A pair of third O-rings 374 are provided on two sides of the guiding disc 311.

In this manner, the hydraulic oil of the hydraulic brake system will fill the oil chambers 371 after the inlet ports 40 of the anti-lock braking control device 1 are connected to the brake circuits 3 and 4. In the closed brake circuits of the hydraulic brake system, the oil pressure will thus be exerted on the second ends 3122 of the rod members 312 in order to push the rod member 312 to permit the ball members 35 to abut the periphery of the driving disk 23 of the rotor shaft 20.

A pressure switch means 70 is connected fluidly to one of the second ends 122 of the second chambers 12 and is connected electrically to the power-driven motor 60 for actuating the motor 60 when the pedal 8 is pressed and the oil pressure of the hydraulic oil in the brake system is increased above a predetermined value, for example, 3 kg/cm$^2$.

Figure 4:
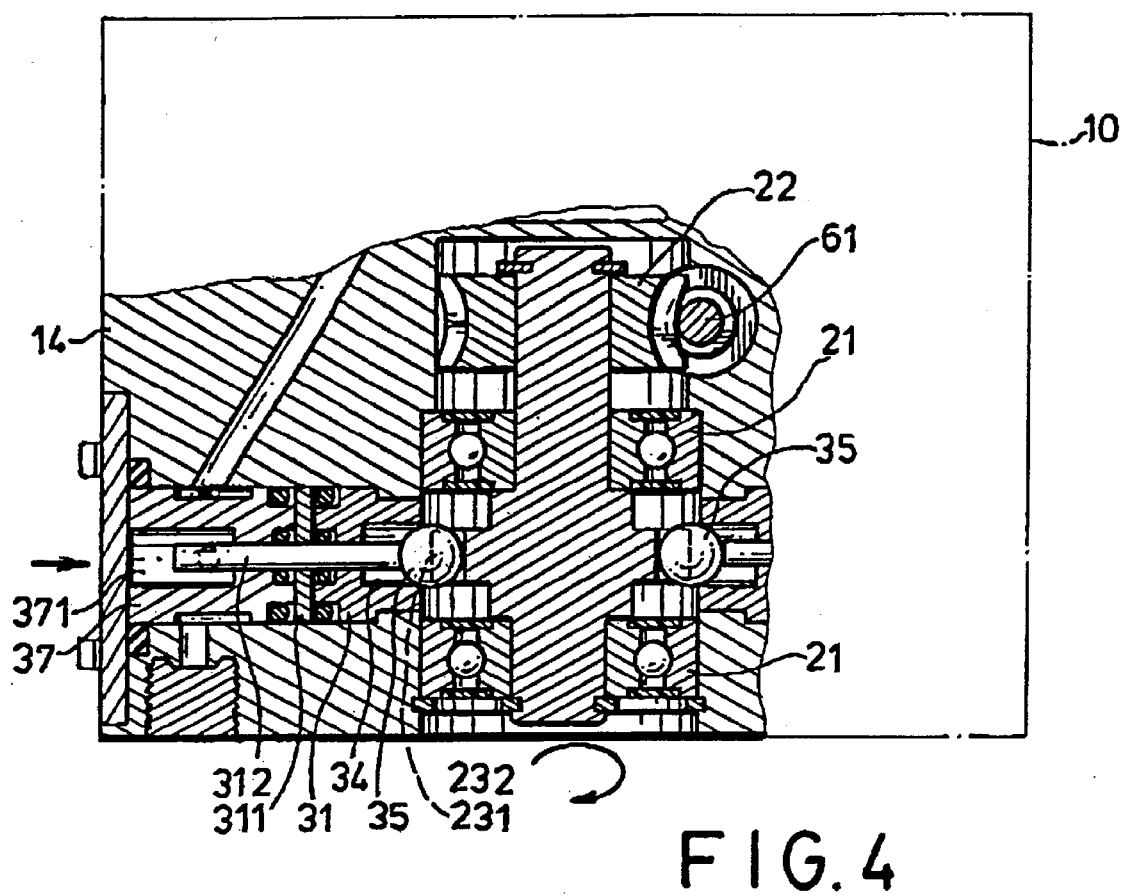
FIG. 4 is a fragmentary sectional view illustrating ball members being in contact with rounded concave portions of the driving disk of the rotor shaft according to the present invention.

When the motor 60 is actuated to rotate the rotor shaft 20, each of the ball members 35 will be driven by the lobes 231 and the concave portions 232 of the driving disk 23 or the rotor shaft 20. When the ball members 35 are in contact with the lobes 231, the rod members 312 will be pushed into the oil chambers 371 by the ball members 35 to expel a part of oil from the oil chambers 371, as best illustrated in FIG. 3. This will result in an increase in the oil pressure of the brake system. On the other hand, when the driving disk 23 continues to rotate, the rod members 312 will be moved toward the ball-receiving cavity 34 and allow the ball members 35 to slide into the concave portions 232 from adjacent lobes 231 by means of the oil pressure, as best illustrated in FIG. 4. This will result in a decrease in the oil pressure of the brake system. Therefore, when the rotor shaft 20 is rotated, the rod members 312 will move reciprocally in the reciprocating pump assemblies 30, thereby producing pressure waves which are transmitted to the front and rear brakes (F, R) and providing an intermittent brake effect.

Regarding the operation of the anti-lock braking control device 1 of FIGS. 1 to 4, when a driver treads on the pedal 8, the master cylinders (B, A) pressurize the oil in the brake lines thus causing the brake pads and/or shoes to exert pressure on the motor or brake drums to stop its revolving motion of the latter. It is noted that as the rod members 312 move toward the second ends 122 of the second chambers 12, the oil accumulated in the oil chambers 371 will be pushed back into the brake lines. When the rod members 312 move toward the first ends 121 of the second chambers 12, thus increasing the volume of the oil chambers 371, the brake oil can be evacuated from the brake lines 5 and 6 via the outlet ports 41, thereby relieving the pressure to the rear and front brakes (R, F). As the rod members 312 cycle back and forth, the brakes are never on or off longer than 1/24th of a second at any time thereby giving the maximum braking action without allowing the wheels to skid or lock. In this embodiment, the motor 60 is rotated at a speed of 6,700 rpm such that the driving disk 23 can drive each of the rod members 312 to move back and forth 24 times per second. Of course, the reciprocating speed of the rod members 312 can be increased by increasing the number of lobes 231 of the driving disk 23.

The present invention has both common braking function and auxiliary intermittent braking effect, i.e. if the pressure switch means 70 fails, the present invention still allows the traditional hydraulic braking motion without any adverse effect. The present invention has excellent safety feature and quick response.

With this invention thus explained, it is apparent that numerous modifications and variations can be made without departing from the scope and spirit of this invention. It is therefore intended that this invention be limited only as indicated in the appended claims.

I claim:

1. An anti-lock braking control device for a hydraulic brake system of an automobile, said hydraulic brake system including a pair of master cylinders and front and rear brakes of said automobile, said anti-lock braking control device being adapted to be installed between said master cylinders and said front and rear brakes and comprising:

a housing having two inlet ports, each of which is adapted to be connected to a respective one of said master cylinders, and two outlet ports, each of which is adapted to be connected to a respective one of said front and rear brakes, said housing defining therein a cylindrical first chamber, two cylindrical second chambers which are aligned with one another, each of said second chambers having a first end which is connected perpendicularly to said first chamber and a second end which is opposite to said first end of said second chamber, a cylindrical third chamber which is communicated with said inlet ports, and a pair of oil passages connecting said third chamber to said second ends of said second chambers, each of said outlet ports being formed adjacent to a respective one of said second ends of said second chambers;

a rotor shaft mounted coaxially and rotatably in said first chamber, said rotor shaft having a driving disk fixed coaxially adjacent to said first ends of said second chambers, said driving disk having a periphery which is formed with a plurality of equally spaced lobes and rounded concave portions between said lobes, said rotor shaft having a driven end;

an oil regulator assembly mounted in said third chamber for controlling flow rate of hydraulic oil from said master cylinders into said oil passages and said second ends of said second chambers;

a power-driven motor fixed to said housing and having an output shaft which extends into said first chamber and which is connected to said driven end of said rotor shaft in order to drive said rotor shaft to rotate;

a pair of reciprocating pump assemblies positioned respectively in said second chambers, each of said reciprocating pump assemblies having a first part which blocks a corresponding one of said first ends of said second chambers and which is formed with a ball-receiving cavity that opens to said first chamber, each of said reciprocating pump assemblies further having a second part which is adjacent to a corresponding one of said second ends of said second chambers and which is formed with an oil chamber that is separated from said ball-receiving cavity, a rod member having a first end that extends slidably and sealingly into said ball-receiving cavity and a second end that extends slidably and sealingly into said oil chamber, and a ball member which is received in said ball-receiving cavity, each of said oil chambers being communicated with the respective one of said second chambers which is in turn communicated with a corresponding one of said oil passages and one of said outlet ports so that the hydraulic oil of said hydraulic brake system can fill said oil chambers and exert an oil pressure on said second ends of said rod members in order to push said ball members to abut said periphery of said driving disk of said rotor shaft; and pressure switch means connected fluidly to one of said second ends of said second chambers and connected electrically to said power-driven motor for actuating said power-driven motor when the oil pressure of said hydraulic oil is greater than a predetermined value;

whereby when said power-driven motor is actuated to rotate said rotor shaft, each of said ball members will be driven by said periphery of said driving disk of said rotor shaft to push a respective one of said rod members to move reciprocally, thereby producing pressure waves which are transmitted to said front and rear brakes and providing an intermittent brake effect.

2. An anti-lock braking control device as claimed in claim 1, wherein each of said second chambers has a diameter-reduced portion formed adjacent to the respective one of said first ends thereof, a shoulder formed adjacent to said diameter-reduced portion, and an enlarged open end formed adjacent to the corresponding one of said second ends of said second chambers.

3. An anti-lock braking control device as claimed in claim 2, wherein:

each of said first parts of said reciprocating pump assemblies is generally cylindrical and has a first end which is fitted into the respective one of said diameter-reduced portions and a second end, an outward radial flange which abuts a corresponding one of said shoulders of said second chambers in order to block the corresponding one of said first ends of said second chambers, a first annular flange which extends from an internal face of each of said first parts in order to form said ball-receiving cavity adjacent to said first end of said first part, and a first seal-receiving cavity adjacent to said second end of said first part, a first O-ring being provided in said first seal-receiving cavity;

each of said second parts of said reciprocating pump assemblies is generally cylindrical and has a first end and a second end which extends to a respective one of said enlarged open ends of said second chambers, an outward radial ring which engages an internal face of the respective one of said second chambers, a second annular flange which extends from an internal face of each of said second parts in order to form said oil chamber adjacent to said second end of said second part, and a second seal-receiving cavity adjacent to said first end of said second part, a through hole being formed adjacent to said second end of said second part to communicate said oil chamber and said oil passage, a second O-ring being provided in said second seal-receiving cavity;

a cover plate is fixed to a respective one of said second ends of said second chamber in order to close a corresponding one of said enlarged open ends and one of said second ends of said second parts; and a guiding disc is sandwiched between said second end of said first part and said first end of said second part, such that each of said rod members can extend slidably and sealingly through the respective one of said first and second annular flanges and one of said guiding discs.

4. An anti-lock braking control device as claimed in claim 1, wherein said output shaft of said power-driven motor comprises a worm.

5. An anti-lock braking control device as claimed in claim 4, wherein said driven end of said rotor shaft is provided with a worm wheel which meshes with said worm of said power-driven motor.

* * * * *